US008559895B2

(12) United States Patent
Fernandez-Corbaton et al.

(10) Patent No.: US 8,559,895 B2

(45) Date of Patent: Oct. 15, 2013

(54) ANTENNA ARRAY PATTERN DISTORTION MITIGATION

(75) Inventors: Ivan Jesus Fernandez-Corbaton, San Diego, CA (US); Ahmad Jalali, Rancho Santa Fe, CA (US); Ernest T. Ozaki, Poway, CA (US); Harris Smith Simon, Poway, CA (US); Sherman A. Gregory, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 455 days.

(21) Appl. No.: 12/567,181

(22) Filed: Sep. 25, 2009

(65) Prior Publication Data

US 2010/0008453 A1 Jan. 14, 2010

Related U.S. Application Data

(62) Division of application No. 11/182,236, filed on Jul. 15, 2005, now Pat. No. 7,610,025.

(60) Provisional application No. 60/666,413, filed on Mar. 29, 2005.

(51) Int. Cl.
*H04B 1/04* (2006.01)

(52) U.S. Cl.
USPC ......... 455/114.2; 455/443; 455/440; 370/208

(58) Field of Classification Search
USPC ............... 455/132, 114.2, 443, 440; 714/795, 714/789; 370/208
See application file for complete search history.

(56) References Cited

U.S. PATENT DOCUMENTS

| | | | |
|---|---|---|---|
| 5,303,240 | A | 4/1994 | Borras et al. |
| 5,383,164 | A | 1/1995 | Sejnowski et al. |
| 5,551,059 | A | 8/1996 | Hutcheson et al. |
| 5,559,865 | A | 9/1996 | Gilhousen |

(Continued)

FOREIGN PATENT DOCUMENTS

| | | | |
|---|---|---|---|
| CN | 1184561 | A | 6/1998 |
| DE | 10004000 | | 8/2001 |

(Continued)

OTHER PUBLICATIONS

European Office Action dated Jul. 8, 2009 for European Patent Application Serial No. 06748938.5, 31 pages.

(Continued)

*Primary Examiner* — Christian Hannon

(74) *Attorney, Agent, or Firm* — Ramin Mobarhan

(57) ABSTRACT

At least one feature provides a way to perform point-to-multipoint transmissions using adaptive or directional antennas while reducing antenna pattern distortion. Generally, rather than transmitting the same waveform to two or more receivers, an information-bearing signal is transformed into different decorrelated waveforms and each decorrelated waveform is transmitted to a different receiver. In one implementation, an information-bearing signal is transformed into two decorrelated signals such that their crosscorrelation, or autocorrelation of the information-bearing signal, is zero or very small. Such decorrelation may be achieved by sending a first signal to a first receiver while sending a second signal, having a radio frequency spectrum that is the spectrally inverted version of the first signal, to a second receiver. In another implementation, a first signal is transmitted to a first receiver and is also transmitted to a second receiver with a time delay.

15 Claims, 3 Drawing Sheets

(56) References Cited

U.S. PATENT DOCUMENTS

| | | | |
|---|---|---|---|
| 5,640,166 A | 6/1997 | Siwiak | |
| 5,757,285 A | 5/1998 | Grabow et al. | |
| 5,844,522 A | 12/1998 | Sheffer et al. | |
| 6,088,828 A * | 7/2000 | De Bart et al. | 714/789 |
| 6,111,865 A | 8/2000 | Butler et al. | |
| 6,141,335 A | 10/2000 | Kuwahara | |
| 6,175,588 B1 | 1/2001 | Visotsky et al. | |
| 6,188,913 B1 | 2/2001 | Fukagawa et al. | |
| 6,263,497 B1 * | 7/2001 | Maeda et al. | 717/170 |
| 6,339,697 B1 | 1/2002 | Ranta | |
| 6,377,802 B1 | 4/2002 | McKenna et al. | |
| 6,564,060 B1 | 5/2003 | Hoagland | |
| 6,680,967 B1 | 1/2004 | Westman | |
| 6,768,913 B1 | 7/2004 | Molnar et al. | |
| 6,862,326 B1 | 3/2005 | Eran et al. | |
| 6,950,064 B2 | 9/2005 | Schantz | |
| 6,963,745 B2 | 11/2005 | Singh et al. | |
| 7,035,214 B1 * | 4/2006 | Seddigh et al. | 370/231 |
| 7,042,858 B1 | 5/2006 | Ma et al. | |
| 7,058,401 B1 | 6/2006 | Sinivaara et al. | |
| 7,082,174 B1 | 7/2006 | Smee et al. | |
| 7,123,593 B1 | 10/2006 | Marque-Pucheu et al. | |
| 7,187,940 B2 | 3/2007 | Kelley | |
| 7,236,515 B1 | 6/2007 | Pope | |
| 7,301,990 B2 | 11/2007 | Jayaraman et al. | |
| 7,315,588 B2 | 1/2008 | Hessel | |
| 7,379,750 B2 | 5/2008 | Jalali | |
| 7,558,576 B2 | 7/2009 | Chen et al. | |
| 7,610,025 B2 | 10/2009 | Fernandez-Corbaton et al. | |
| 7,684,802 B2 | 3/2010 | Jalali | |
| 7,933,599 B2 | 4/2011 | Fernandez-Corbaton et al. | |
| 2002/0025811 A1 | 2/2002 | Willey | |
| 2002/0051442 A1 | 5/2002 | Lee et al. | |
| 2002/0137538 A1 | 9/2002 | Chen et al. | |
| 2002/0150075 A1 | 10/2002 | Belcea | |
| 2002/0166097 A1 | 11/2002 | Persson et al. | |
| 2002/0173269 A1 | 11/2002 | Grayson et al. | |
| 2003/0069043 A1 | 4/2003 | Chhaochharia et al. | |
| 2003/0099215 A1 | 5/2003 | O'Shea | |
| 2003/0099356 A1 | 5/2003 | Fujino et al. | |
| 2003/0126066 A1 | 7/2003 | Nunes et al. | |
| 2003/0142739 A1 | 7/2003 | Shiozawa | |
| 2004/0014431 A1 | 1/2004 | Lo | |
| 2004/0092280 A1 | 5/2004 | Lee | |
| 2004/0101074 A1 | 5/2004 | Wilson | |
| 2004/0174298 A1 | 9/2004 | Eriksson | |
| 2004/0179544 A1 | 9/2004 | Wilson et al. | |
| 2004/0248519 A1 | 12/2004 | Niemela | |
| 2004/0259556 A1 | 12/2004 | Czys | |
| 2005/0071877 A1 * | 3/2005 | Navarro | 725/68 |
| 2005/0111405 A1 | 5/2005 | Kanterakis | |
| 2005/0143118 A1 | 6/2005 | Bernhardsson et al. | |
| 2005/0148370 A1 | 7/2005 | Moldoveanu et al. | |
| 2005/0157684 A1 | 7/2005 | Ylitalo et al. | |
| 2005/0164655 A1 | 7/2005 | Nakao et al. | |
| 2005/0276247 A1 | 12/2005 | Heiman et al. | |
| 2006/0045040 A1 | 3/2006 | Tian et al. | |

FOREIGN PATENT DOCUMENTS

| | | | |
|---|---|---|---|
| EP | 0862343 | | 9/1998 |
| EP | 0932319 | A2 | 7/1999 |
| EP | 1041850 | | 10/2000 |
| EP | 1069706 | A1 | 1/2001 |
| EP | 1239615 | A1 | 9/2002 |
| EP | 1458205 | | 9/2004 |
| GB | 2393077 | | 3/2004 |
| JP | 1070502 | | 3/1998 |
| JP | 10256971 | A | 9/1998 |
| JP | 11266232 | A | 9/1999 |
| JP | 2000-501907 | | 2/2000 |
| JP | 2001094496 | A | 4/2001 |
| JP | 2001308828 | A | 11/2001 |
| JP | 2005039552 | A | 2/2005 |
| TW | 465204 | | 11/2001 |
| TW | 493321 | | 7/2007 |
| WO | 9608850 | | 3/1996 |
| WO | 9630964 | | 10/1996 |
| WO | 9637973 | | 11/1996 |
| WO | 9721284 | | 6/1997 |
| WO | 0118986 | A1 | 3/2001 |
| WO | 0249150 | A2 | 6/2002 |
| WO | 02054818 | | 7/2002 |
| WO | 03081938 | A1 | 10/2003 |
| WO | 03092320 | A1 | 11/2003 |
| WO | 2004062177 | A2 | 7/2004 |
| WO | 2005013525 | A1 | 2/2005 |

OTHER PUBLICATIONS

Office Action dated Feb. 9, 2009 for U.S. Appl. No. 11/182,236, 24 pages.

Office Action dated Sep. 18, 2008 for U.S. Appl. No. 11/182,236, 25 pages.

Agrawal, P. et al. "An Adaptive Power Control and Coding Scheme for Mobile Radio Systems," IEEE International Conference on Personal Wireless Communications, New Delhi, India, Feb. 19-21, 1996. XP010158329. pp. 283-288.

International Search Report dated Jul. 26, 2006 for PCT Application Serial No. PCT/US2006/011650, 3 pages.

Korean Office Action dated Nov. 11, 2009 for KR Application Serial No. 10-2007-7024981, 5 pages.

European Office Action dated Feb. 18, 2008 for EP Application Serial No. 06748938.5, 4 pages.

Indian Office Action dated Oct. 12, 2009 for IN Application Serial No. 1663/MUMNP/2007, 2 pages.

Japanese Office Action dated Sep. 7, 2010 for Japanese Patent Application Serial No. 2008-504363, 3 pages.

Korean Office Action dated Dec. 29, 2010 for Korean Patent Application Serial No. 10-2007-7024981, 4 pages.

Korean Office Action dated Mar. 11, 2011 for Korean Patent Application Serial No. 10-2011-7004860, 2 pages.

Argentina OA dated Feb. 11, 2010 for US Application Serial No. P 06 01 01233, 2 pages.

Austin M.D., et al., "Velocity adaptive handoff algorithms for microcellular systems", IEEE Transactions on Vehicular Technology, IEEE Service Center, Piscataway, NJ, US, Aug. 1, 1994, pp. 549-561, p. 549, left-hand column, paragraph 1 - p. 550, right-hand column, paragraph 2, http://ieeexplore.ieee.org/xpls/abs_all. Jspar number=312791.

Jones J.W., et al., "A Timed-Shared Digital Filter Realization", IEEE Transactions on Computers, IEEE Inc. New York, US, vol. C-18, No. 11, Nov. 1969 pp. 1027-1030, XP000760795, ISSN: 0018-9340.

Written Opinion—PCT/US2006/011650, International Search Authority—European Patent Office - Jul. 26, 2006.

* cited by examiner

ANTENNA ARRAY PATTERN DISTORTION MITIGATION

CROSS-REFERENCE TO RELATED APPLICATIONS

This application is a division of non-provisional application Ser. No. 11/182,236, filed Jul. 15, 2005, and claims the benefit thereof under 35 U.S.C. §120. Application Ser. No. 11/182,236 claims the benefit under 35 U.S.C. §119 of provisional application No. 60/666,413, filed Mar. 29, 2005. Each of the applications identified in the foregoing is hereby incorporated herein in its entirety by reference.

BACKGROUND

Various features pertain to directional and/or adaptive antennas. At least one implementation pertains to a method, system, and device for transmitting the same signal to two receivers while reducing antenna pattern distortion.

Directional and/or adaptive antennas are typically used to direct a signal transmission in a desired direction. These types of antennas have many advantages over omni-directional antennas when used in modern communications systems. These advantages occur for both transmission and reception of information-bearing signals. During transmission the directional concentration of radiated energy towards a receiver's location significantly increases the amount of received power per unit of transmitted power. This generally improves the quality of the transmitter-to-receiver link and allows higher rates of information transfer. For constant rate transmissions, this improvement in the underlying link enables a reduction in transmitted power, which results in smaller and cheaper power amplifiers. Directional transmissions also contribute to power economy, which is a key consideration in battery-powered devices. Furthermore, in interference-limited systems the concentration of power towards the intended receiver reduces the interference caused by the transmitter to the rest of the system, hence increasing its overall capacity.

Directional antennas are typically implemented as arrays of weighted antenna elements that produce different patterns depending on the weight vector applied. Generally, a receiver and/or transmitter may apply any weight vector to such weighted antennas. One type of directional antenna is a beam switch antenna that can be thought of as being an array of antennas that can be weighted by a finite predefined set of vectors. These predefined set of vectors typically point the resulting antenna beam towards different spatial directions.

In most modern cellular and/or wireless communication systems there are times when the same information is transmitted from a single point to multiple receivers. This is the case, for example, (a) when broadcast channels are employed from a central base station to several user terminals and/or (b) where a particular user's transmission is demodulated by multiple base stations, for instance during the handoff process when the user's terminal transitions from its currently serving base station towards a new base station. For the reasons previously, stated, it is often desirable to employ antenna arrays in these point-to-multipoint transmissions.

It is often the case that each individual entity (e.g., base station or user terminal) transmits a known reference signal, commonly referred to as "pilot", in order to facilitate the demodulation process at a receiving end. For example, a user terminal could utilize a given base station's pilot signal to find the weight vector(s) that produces the best antenna pattern for communication with such base station. In this context, one way of accommodating the transmission towards multiple points would be to find out the best antenna patterns to use if it were to transmit individually to each one of the multiple receivers and then attempt to synthesize an overall pattern by the sum of all the individual patterns. This combined pattern would be used for the point-to-multipoint transmission.

In generating an antenna pattern to transmit the same signal to multiple receivers, antenna pattern distortions may arise. That is, by transmitting the same signal to multiple carriers, unwanted transmission distortions and cancellations occur that degrade point-to-multipoint transmissions.

SUMMARY

One implementation provides a method for mitigating antenna array pattern distortions in signals transmitted to different receivers comprising the steps of (a) selecting a first signal and a second signal that are decorrelated versions of a third signal, (b) transmitting the first signal to a first receiver, and (c) transmitting the second signal to a second receiver. Selecting the first and second signals may include selecting two signals such that their cross-correlation is approximately zero or very small. Such cross-correlation may be achieved by (a) selecting first and second codes that are different from each other, (b) applying the first code to the third signal to generate the first signal and (c) applying the second code to the third signal to generate the second signal. The second code may be the spectrum-inverted version of the first code. Additionally, selecting the first and second signals may include (a) selecting a first code that is a time-delayed or time-reversed version of a second code, (b) applying the first code to the third signal to generate the first signal, and (c) applying the second code to the third signal to generate the second signal. The first and second signals may be transmitted in different directional beams.

Another implementation provides an apparatus for mitigating antenna array pattern distortions in signals transmitted to different receivers including (a) means for generating first and second signals that are decorrelated versions of a third signal, and (b) means for transmitting the first and second signals to different receivers on different beams. The means for generating the first and second signals may include (a) means for selecting a first and second polynomials that are different (e.g., time-delayed, time-reversed, etc.) from each other, (b) means for applying the first polynomial to the third signal to generate the first signal, and (c) means for applying the second polynomial to the third signal to generate the second signal.

Another implementation provides a machine readable medium comprising instructions executable by a processor for mitigating antenna array pattern distortions in signals transmitted to different receivers, which when executed by a processor, causes the processor to perform operations comprising (a) generate an information-bearing signal, (b) generate a first signal and a second signal that are decorrelated versions of the information-bearing signal, and (c) transmit the first signal and second signal to different receivers.

Yet another implementation provides a wireless a transmitter comprising (a) a configurable directional antenna, and (b) a processing circuit communicatively coupled to the directional antenna to configure the antenna and process signals transmitted through the directional antenna, the processing circuit configured to (1) generate a first signal and a second signal that are decorrelated versions of a third signal, (2) transmit the first signal to a first receiver, and (3) transmit the second signal to a second receiver.

The first and second signals may be generated by either (a) selecting first and second codes that are different from each other, (b) selecting a first code that is a time-delayed version of a second code, or (c) selecting a first code that is a time-reversed version of a second code. A storage device may be communicatively coupled to the processing circuit to store values used to configure the directional antenna. The transmitter may configure the directional antenna to (a) transmit the first signal to the first receiver on a first beam, and (b) transmit the second signal to the second receiver on a second beam to initiate a handoff procedure between a first and second receiver. The transmitter may be mounted on a moving aircraft and the first and second receivers may be stationary.

The processing circuit is further configured to transfer communications to the second receiver once a link is established with the second receiver. The processing circuit may also be configured to terminate communications with the first receiver once a link is established with the second receiver. Additionally, the processing unit may be further configured to search for pilot signals from receivers on a plurality of beams. The transmitter may include a second antenna communicatively coupled to the processing circuit and selectably activated to search for the presence of other receivers.

Yet another implementation provides a method for receiving signals including the steps of (a) receiving one of a plurality of signals from a wireless transmitter, and (b) demodulating the one or more signals by either a spectrum inversion code, time shifting code, or time reversal code. The method may further include the steps of (a) notifying the wireless transmitter that the one or more signals have been properly received, (b) receiving a signal from the wireless transmitter or an out of band signal indicating how the one or more signals should be demodulated.

One example of the invention also provides a microprocessor including an input interface to receive an information-bearing signal, a circuit configured to generate a first signal and a second signal that are decorrelated versions of the information-bearing signal, and an output interface to send the first signal and second signal to an antenna for transmission. The circuit may be further configured to switch the antenna from a first direction to a second direction so that the first signal is transmitted in the first direction and the second signal is transmitted in the second direction. The first and second signals may be generated by either (a) selecting a first and second codes that are different from each other, (b) selecting a first code that is a time-delayed version of a second code, or (c) selecting a first code that is a time-reversed version of a second code. The circuit then applies the first code to the information-bearing signal to generate the first signal and applies the second code to the information-bearing signal to generate the second signal.

DETAILED DESCRIPTION

Figure 1:
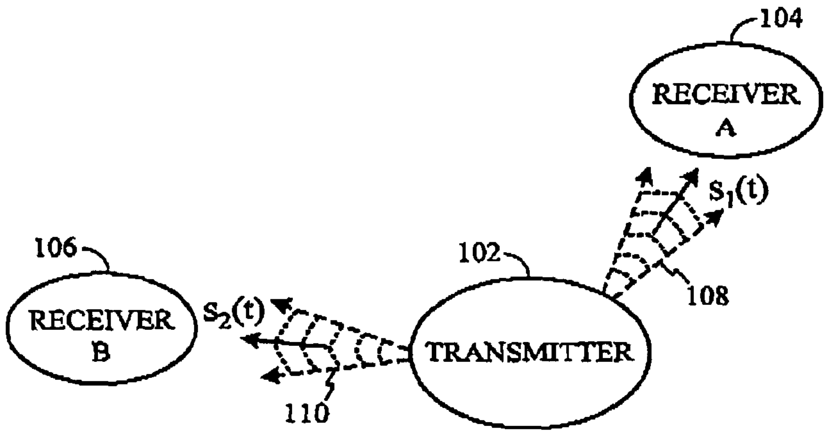
FIG. 1 illustrates a feature where a transmitter reduces antenna pattern distortion when the same signal is transmitted to two different receivers.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In many applications, it is often desirable for a transmitter to switch from communicating with a first receiver to communicating with a second receiver. For example, as the transmitter moves (e.g., as when mounted on an aircraft), it may get further away from a first receiver and closer to a second receiver. In that situation, the transmitter may change its communication link from the first receiver to the second receiver. This handoff should often be accomplished without noticeable delays or loss of transmitted information. One way of achieving such handoff is to communicate with both the first receiver and second receiver, for a period of time, during the handoff. During this handoff period the transmitter may send the same signal to both the first and second receivers. However, when the transmitter uses an adaptive or directional antenna, the transmission of the same signal to the two receivers may cause unwanted antenna pattern distortion.

One feature provides a way to perform point-to-multipoint transmissions using adaptive or directional antennas while reducing antenna pattern distortion. Generally, rather than transmitting the same waveform to two receivers, an information-bearing signal is transformed into two different waveforms and each waveform is transmitted to a different receiver. This concept can be expanded to accommodate more than two receivers.

Another feature transforms an information-bearing signal s(t) into two decorrelated signals $s_1(t)$ and $s_2(t)$ such that their crosscorrelation ρ is zero or very small. By decorrelating signals $s_1(t)$ and $s_2(t)$ antenna pattern distortion is reduced or eliminated.

One example of how such decorrelation is achieved by the present invention by sending a first signal $s_1(t)$ to a first receiver while sending a second signal $s_2(t)$, having a radio frequency spectrum that is the spectrally inverted version of $s_1(t)$, to a second receiver.

Another example of how such decorrelation is achieved is by sending a first signal $s_1(t)$ to a first receiver while sending a second signal $s_2(t)$ to a second receiver, with a time delay Δ between two signals $s_1(t)$ and $s_2(t)$, where $s_1(t)$ and $s_2(t)$ are the same signal s(t) and $s_2(t)=s_1(t)-\Delta$. The appropriate time delay Δ can be selected by determining or estimating a zero point for the autocorrelation of s(t).

Consider a transmitter unit with an array of M antennas (where M is a positive integer) that transmits an information-bearing signal or waveform s(t) towards a single desired receiver. The transmitter may know an appropriate antenna array weight vector $\vec{w}$ for the purpose of transmitting signal s(t) to the desired receiver. The array weight vector $\vec{w}$ may be used to configure an adaptive or directional antenna, including a beam switch antenna, on the transmitter to direct transmission of signal s(t) towards a desired receiver. The carrier frequency the signal is defined as $f_0$. The spatial coordinates variable is defined as $\vec{x}$ and the spatial coordinates of the array antenna elements are $\vec{x}_m \forall m \in \{1 \ldots M\}$. The transmitter's antenna array weight vector components are defined as $\vec{w} \equiv [w_1, w_2, \ldots, w_M]$.

Typically, M copies of a signal or waveform s(t) are generated, each copy of the signal s(t) is weighted by a corresponding weight vector $w_i$ and modulated by the carrier frequency $f_0$ before being transmitted over one of the M antenna element ports. At a location $\vec{x}$, the time-varying signal coming from the different antennas adds up to produce a spatiotemporal waveform. This spatiotemporal waveform can be approximated and represented in complex number notation as the function $$y(t, \vec{x}) \approx e^{j2\pi f_0 t} s(t-\tau) \sum_{m=1}^{M} w_m e^{-j2\pi f_0 \frac{|\vec{x}-\vec{x}_m|}{c}} \quad (1)$$

where c is the speed of light and τ is a constant delay. This notation may be simplified by making $$W(\vec{x}, \vec{w}) \equiv \sum_{m=1}^{M} w_m e^{-j2\pi f_0 \frac{|\vec{x}-\vec{x}_m|}{c}}$$

The radiated power towards location $\vec{x}$ may take the expected value $|y(t,\vec{x})|^2$. The terms "expected value", "expectation", and "expectancy" are used in the probabilistic sense and refer to the likelihood of an occurrence. The expectation $E_{s(t)}$ of the waveform s(t), which for this analysis may be considered to be a wide sense stationary stochastic process, can be represented as $$E_{s(t)}\{|y(t,\vec{x})|^2\} = \sigma_s^2 |W(\vec{x},\vec{w})|^2 \equiv \sigma_s^2 P(\vec{x},\vec{w}) \quad (2)$$

where $\sigma_s^2$ is the average power of the waveform s(t). Strictly speaking, the transmitted waveforms may be cyclostationary. However, for the purpose of this analysis this does not affect the results.

The quantity $P(\vec{x},\vec{w})$ is controlled by weight vector components $\vec{w}$, as seen in equation (2). $P(\vec{x},\vec{w})$ is also equivalent to the traditional definition of an antenna pattern except for normalization factors.

FIG. 1 illustrates a feature where a transmitter 102 reduces antenna pattern distortion when the same signal is transmitted to two different receivers 104 and 106. In some implementations, the transmission of the same information to two different receivers 104 and 106 may occur as transmitter 102 gets further away from first receiver 104 and switches or handoffs to nearby second receiver 106. However, the present invention may be implemented in various systems, not just in handoff situations. In some situations, receivers 104 and/or 106 are stationary while transmitter 102 moves, in other situations receivers 104 and/or 106 move and transmitter 102 remains stationary, while yet in other situations receivers 104 and/or 106 and transmitter 102 may all be stationary or in motion.

The transmitter 102 may decide to switch from first receiver 104 to second receiver 106 in a number of different ways. For example, transmitter 102 may scan for pilot or beacons signals from receivers, either periodically or as needed. Transmitter 102 may compare the pilot signal strengths and switch to the receiver with the highest pilot signal strength. In one implementation, the transmitter 102 may switch receivers if the signal strength of its current receiver falls below a predetermined threshold level.

Transmitter 102 includes an adaptive or directional antenna to send directional transmissions 108 and 110 to receivers 104 and 106 respectively. Transmitter 102 may include, generate, or retrieve antenna array weight vectors $\vec{w}$ that it can use to configure the adaptive antenna as desired. The antenna array weight vectors $\vec{w}$ may be predefined or calculated on the fly by transmitter 102. Transmitter 102 may include a memory or data storage device to store the antenna array weight vectors $\vec{w}$. Transmitter 102 may also include a processing unit or circuit configured to process the signal(s) to be transmitted and/or setup the antenna with the appropriate weight vectors $\vec{w}$ and transmit a signal s(t) over the antenna. For instance, the transmitter may generate M copies of the signal to be transmitted, weighs each copy of the signal by a corresponding weight vector $w_i$ and transmits each weighted copy of the signal over each one of M antenna element ports.

The use of an adaptive or directional antenna at transmitter 102 has the advantage of focusing the beam(s) to desired receivers, reducing the amount of power needed for transmission, and reducing unwanted interference. This leads to an improved throughput over omni-directional antennas. For example, a directional antenna may achieve a forward link (base station to receiver) throughput of two times or more than an omni-directional antenna for the same amount of power transmitted by a base station. The directional antenna may also achieve a reverse link (receiver to base station) throughput that is thirty to forty percent greater than an omni-directional antenna for the same amount of power transmitted by a receiver.

In one implementation, transmitter 102 obtains two weight vectors $\vec{w}_1$ and $\vec{w}_2$ to communicate with receivers 104 and 106, respectively. The same signal s(t) is transmitted to two receivers as $s_1(t)$ and $s_2(t)$. The two signals $s_1(t)$ and $s_2(t)$ follow a similar processing as described above such that the voltages at each antenna element are $$v_m(t)=(s_1(t)w_{1,m}+s_2(t)w_{2,m})e^{j2\pi f_0 t}$$

Following the same simplification through which equation (2) was obtained, the expectancy (E) of $s_1(t)$ and $s_2(t)$ is defined as $$E_{s_1(t),s_2(t)}\{|y(t,\vec{x})|^2\}=\sigma_1^2P_1(\vec{x},\vec{w})+\sigma_2^2P_2(\vec{x},\vec{w})+2\Re\{\rho W_1(\vec{x},\vec{w}_1)W_2(\vec{x},\vec{w}_2)^*\} \quad (3)$$

where $\sigma_1^2$ and $\sigma_2^2$ are the average powers of $s_1(t)$ and $s_2(t)$, respectively, $\rho=E\{s_1(t)s_2(t)^*\}$ is the crosscorrelation of signals $s_1(t)$ and $s_2(t)$, and the operator (.)* denotes a complex conjugate.

Equation (3), above, represents the desired power radiation pattern, defined by $$\sigma_1^2P_1(\vec{x},\vec{w})+\sigma_2^2P_2(\vec{x},\vec{w})$$

and a distortion term $$2\Re\{\rho W_1(\vec{x},\vec{w}_1)W_2(\vec{x},\vec{w}_2)^*\}. \quad (4)$$

It is important to note that this distortion term is proportional to ρ.

The antenna radiation pattern, represented by equation (3), is not the best that could be used because there is the potential of energy leaking from one radiation beam 108 to another 110. This leaking from one radiation beam 108 to another 110 reduces the quality of the transmitted signal.

Since the same signal s(t) is transmitted to receivers 104 and 106, as $s_1(t)$ and $s_2(t)$, this means that the crosscorrelation ($\rho=\sigma_s^2$) takes its maximum value. This is a highly undesirable effect that alters the overall antenna radiation pattern and can even point the transmitted energy away from the intended receivers.

Figure 2:
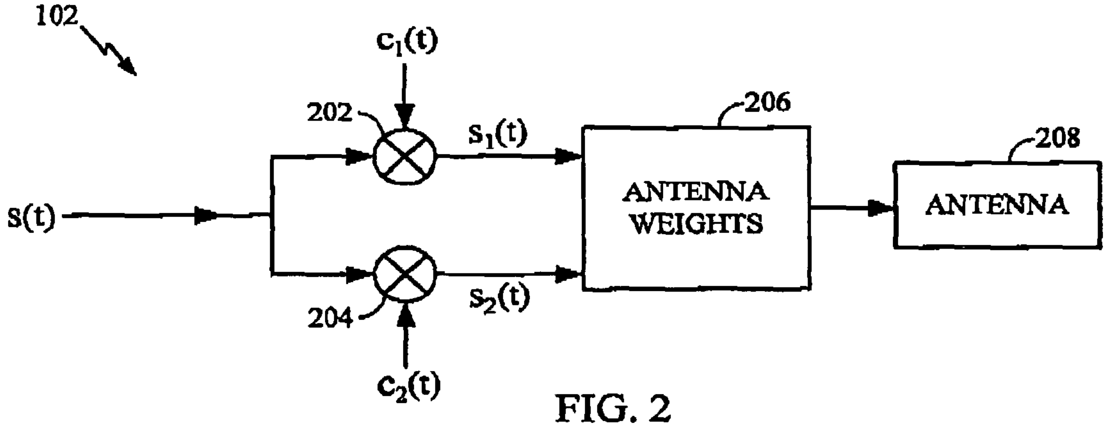
FIG. 2 is a block diagram illustrating a scheme for reducing antenna pattern distortion by applying different codes to a signal to generate different signal sequences.

FIG. 2 is a block diagram illustrating a scheme for reducing antenna pattern distortion by applying different codes $c_1(t)$ and $c_2(t)$ to a signal s(t) to generate different sequences $s_1(t)$ and $s_2(t)$. This scheme may be implemented in transmitter 102. This feature reduces antenna pattern distortion by selecting $s_1(t)$ and $s_2(t)$ such that their crosscorrelation ρ is zero or very small. While this may seem to conflict with the intent to send the same information towards both receivers, that is not the case.

Two different codes $c_1(t)$ and $c_2(t)$ are applied to the same signal or waveform s(t) 202 and 204 such that $$s_1(t)=c_1(t)s(t)$$

$$s_2(t)=c_2(t)s(t)$$

The resulting crosscorrelation term is now $$\rho=E\{c_1(t)s(t)s(t)^*c_2(t)^*\}=\sigma_s^2E\{c_1(t)c_2(t)^*\}=\sigma_s^2\rho_{c_1c_2}$$

where statistical independence between s(t) and both $c_1(t)$ and $c_2(t)$ has been invoked.

There are many well-known sets of codes $c_1(t)$ and $c_2(t)$ with zero or very small crosscorrelation $\rho_{c_1c_2}$. Pseudorandom sequences like the ones used for bandwidth spreading in modern cellular communication standards like IS-856 and CDMA2000 are an example. Different codes or generating polynomials $c_1(t)$ and $c_2(t)$ may be used to generate different sequences $s_1(t)$ and $s_2(t)$.

According to one implementation, delayed versions of the same sequence and/or time reversed version of the same sequence may be used to produce codes $c_1(t)$ and $c_2(t)$ with very low crosscorrelation $\rho_{c_1c_2}$. Since $s(t)=i_s(t)+jq_s(t)$ is a complex baseband signal, then if the expectation $E\{i_s(t)q_s(t)^*\}$ is small, like it is by design for the waveforms employed in most modern cellular communication standards, a simple baseband transformation of s(t) will achieve the objective. Specifically, $$s_1(t)=s(t)=i_s(t)+jq_s(t), \text{ and}$$

$$s_2(t)=i_s(t)-jq_s(t)$$

which results in a very low crosscorrelation $\rho_{c_1c_2}$. Antenna array weight vectors 206 are then applied to signals $s_1(t)$ and $s_2(t)$ before transmission over an adaptive or directional antenna 208.

Figure 3:
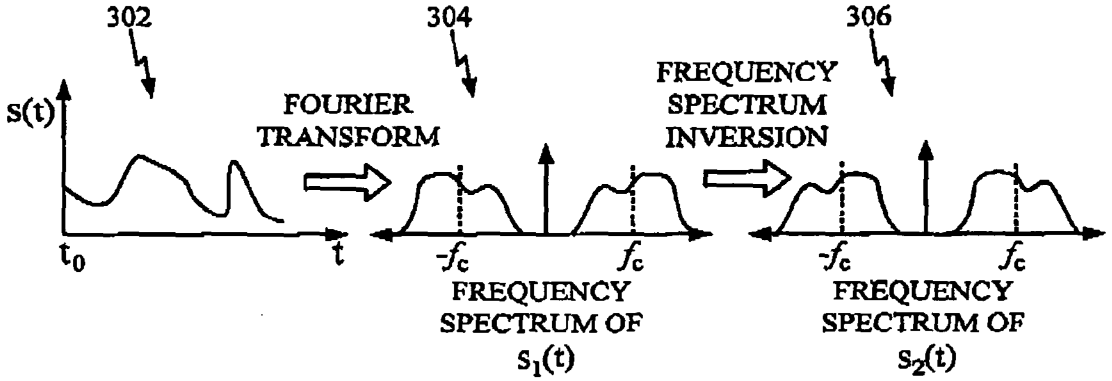
FIG. 3 illustrates how a signal is transformed into two decorrelated signals according to one implementation.

FIG. 3 illustrates how a signal s(t) is transformed into two decorrelated signals $s_1(t)$ and $s_2(t)$ according to one implementation. The time domain signal s(t) 302 has a frequency domain 304. A first waveform $s_1(t)$ is defined to be the same as the original waveform $s(t)=i_s(t)+jq_s(t)$. Meanwhile, a second waveform $s_2(t)$ is the baseband transformation of s(t) and has a radio frequency spectrum 306 that is the spectrally inverted version of the one obtained in the untransformed waveform $s_1(t)$ 304. In this manner, the decorrelated signals $s_1(t)$ and $s_2(t)$ can carry the same information to two different receivers at the same time while reducing antenna pattern distortion.

To properly search for and demodulate the waveform $s_2(t)$, which is the spectrally inverted version of $s_1(t)$, receivers should be aware of the waveform changes (i.e., spectrum inversion). This may be done in a number of ways. For example, a rule may be established whereby a new receiver with which communications are to be established always searches for the inverted signal. Such rule would also provide for a way to then switch to a non-inverted signal once communications are established. For instance, the transmitter may send a control signal or marker that the inverted signal will be switched to a non-inverted signal in a defined period of time. In other implementations, the transmitter and receiver may be configured to automatically switch to a non-inverted signal after a defined period of time.

Another way in which this search may be accomplished is that the receivers (e.g., base stations) can search for both signals $s_1(t)$ and $s_2(t)$. Yet another solution would be for upper layer signaling to be used by the communication system to inform the receivers of whether they should be searching for non-inverted signal $s_1(t)$ or spectrally inverted signal $s_2(t)$.

Due to its robustness and lack of additional performance penalty, spectrum inversion is a good option for a newly designed transmission system. The downside of this approach is that the receivers have to be aware of the changes (i.e., spectrum inversion) introduced in the waveform $s_2(t)$ in order to properly search for and demodulate the waveform $s_2(t)$. This creates a problem when implementing this solution with existing systems (e.g., receiving base stations) that are not designed to receive and/or demodulate spectrally inverted waveforms.

Figure 4:
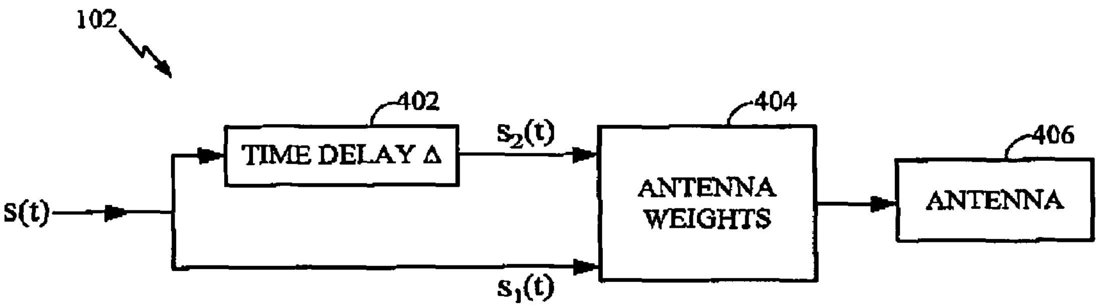
FIG. 4 is a block diagram illustrating a scheme for reducing pattern distortion in a point-to-multipoint transmission without prior knowledge of the signal according to one implementation.

FIG. 4 is a block diagram illustrating a scheme for reducing pattern distortion in a point-to-multipoint transmission without prior knowledge of the signal according to one implementation. This scheme may be implemented in transmitter 102. Generally, decorrelation of two versions $s_1(t)$ and $s_2(t)$ of the same signal s(t) is achieved by introducing a time delay Δ 402 between signals $s_1(t)$ and $s_2(t)$. Antenna array weight vectors 404 are then applied to signals $s_1(t)$ and $s_2(t)$ before transmission over an adaptive or directional antenna 406. The time delay Δ between $s_1(t)$ and $s_2(t)$ may be represented as $$s_1(t)=s(t)$$

$$s_2(t)=s(t-\Delta).$$

Figure 5:
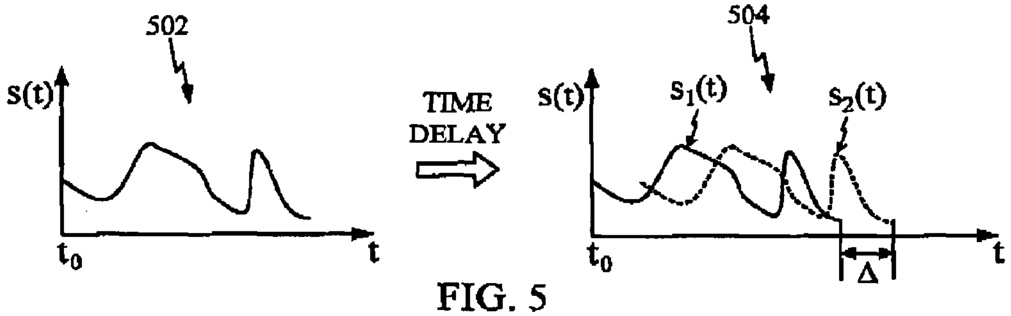
FIG. 5 illustrates how a signal is transformed into two decorrelated signals according to the scheme in FIG. 4.

FIG. 5 illustrates how a signal s(t) 502 is transformed into two decorrelated signals $s_1(t)$ and $s_2(t)$ 504 according to the scheme in FIG. 4. A first receiver receives waveform $s_1(t)$ while a second receiver receives waveform $s_2(t)$ Δ units of time later 504. For small values of time Δ, this delay has no effect in the communication. The crosscorrelation term ρ for these time-delayed signals $s_1(t)$ and $s_2(t)$ is $$\rho=E\{s(t)s(t-\Delta)^*\}=\sigma_s^2R_{ss}(\Delta).$$

The crosscorrelation ρ is proportional to the transmitted signal autocorrelation function Rss(Δ). This autocorrelation function Rss(Δ) depends on the pulse shaping waveform used for signal transmission and it is therefore known.

Figure 6:
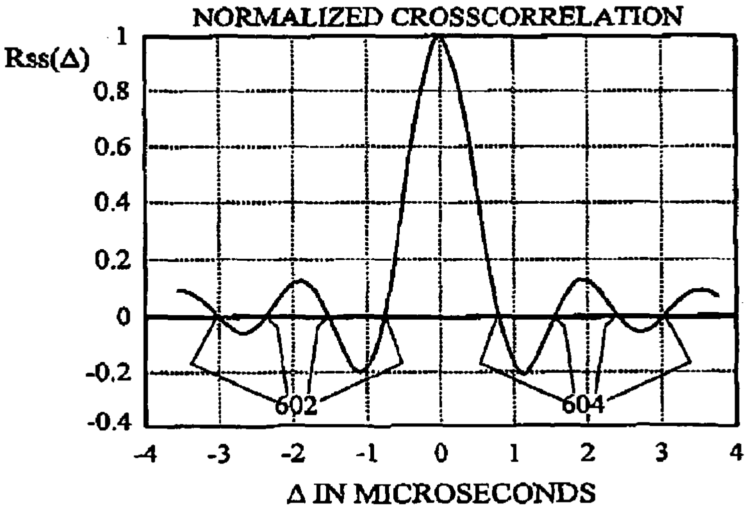
FIG. 6 illustrates a typical autocorrelation function that may be used to select an appropriate time delay to decorate two signals according to one example.

FIG. 6 illustrates a typical autocorrelation function Rss(Δ). There are values 602 and 604 of time delay Δ that results in Rss(Δ) being zero or very small. Since these values 602 and 604 are known, the exact choice of an advantageous time delay Δ can be preselected at the time that the transmitter is designed, built, or configured.

There are different ways of achieving such time delay Δ in a transmitter. For example, a digital time delay may be introduced before the point where signals $s_1(t)$ and $s_2(t)$ are sampled by a digital to analog converter (DAC). In such system, a separate DAC may be used by each signal $s_1(t)$ and $s_2(t)$.

Another example of how such time delay Δ may be achieved is by introducing an analog time delay somewhere along the analog signal's path before reaching the antenna. Such delay may be implemented as a radio frequency Surface Acoustic Wave (SAW) filter delay line that has been tuned to the desired value of Δ.

Figure 7:
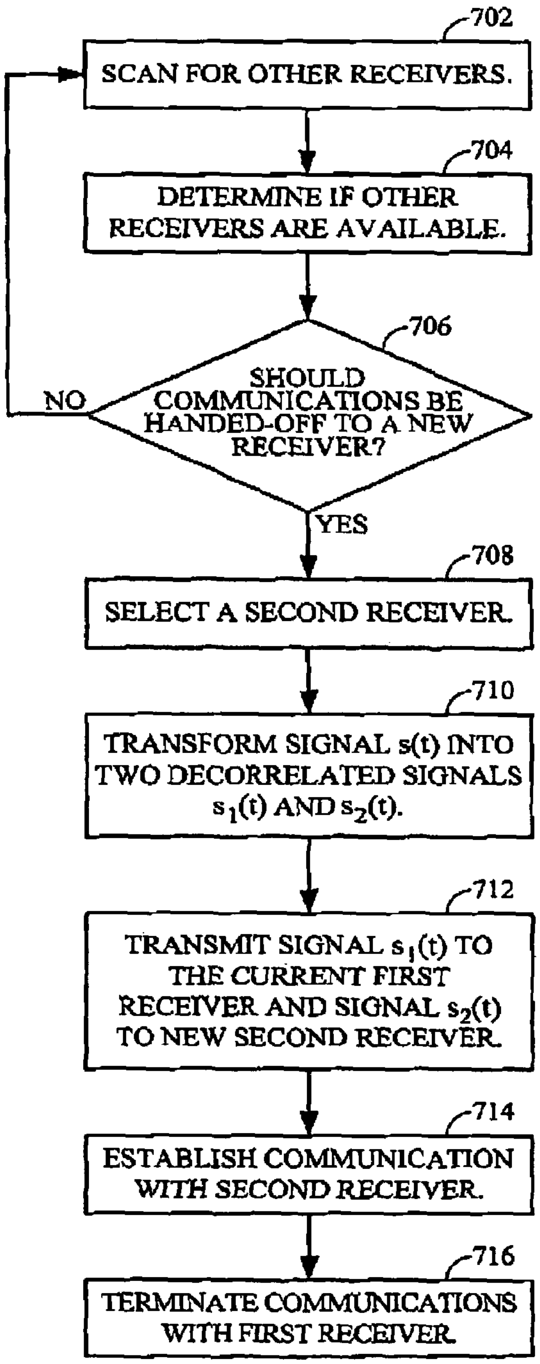
FIG. 7 illustrates a method of performing a transmission handoff from a first receiver to a second receiver while mitigating antenna pattern distortion according to one implementation.

FIG. 7 illustrates a method of performing a transmission handoff from a first receiver to a second receiver while mitigating antenna pattern distortion according to one feature. The transmitter may scan for other receivers 702. This may be accomplished by searching for pilot signals or any of the other ways previously described. The transmitter then determines if other receivers are available 704. This may be done by detecting the pilot signals from other receivers and determining their strength or in other ways. The transmitter, receiver, or combination thereof, may then determine if communications should be handed-off to a second receiver 706. This may be done by determining if the current first receiver has a signal strength that is below a threshold level or if any of the scanned receivers has a stronger signal strength. Alternatively, the first receiver may ascertain whether the signal strength from the transmitter is below a threshold value. If no handoff is warranted, then the transmitter continues communications with the current first receiver. Otherwise, the transmitter and/or first receiver selects the best second receiver with which to establish communications 708. This may be done by selecting the receiver having the strongest pilot signal strength or in other ways. The same signal s(t) is transmitted to both the current first receiver and new second receiver by first transforming the signal s(t) into two decorrelated signals $s_1(t)$ and $s_2(t)$ 710 and then transmitting one signal to each receiver 712. The decorrelation of signal s(t) may be accomplished by any of the novel ways previously described. In one implementation, a communication link is then established between the transmitter and new second receiver 714 and then communication link between the transmitter and first receiver is terminated 716.

Referring again to FIG. 1, transmitter 102 may include an adaptive antenna, which may be a beam switch antenna having N predefined weight vectors $w_i$ that generate a directional beam in one of N directions, where N is an integer. While some handoff schemes from a first receiver to a second receiver may be accomplished by transmitting an omni-directional signal, this has the unwanted effect of requiring more transmission power and causing interference with unrelated receivers and other communication systems. Thus, one implementation provides two antennas employed by transmitter 102, a first antenna that communicates with first receiver 104 and a second antenna that is activated when communications with second receiver 106 are desired. For example, the second antenna may be used during a communication handoff from first receiver 104 to second receiver 106. The second antenna may be activated to search for pilot signals from other receivers. This allows maintaining a constant communication link between transmitter 102 and first receiver 104, via the first antenna, without the need to switch for search for other receivers. The second antenna may help establish or negotiate a second communication link between receiver 102 and second receiver 106. Once the second communication link is established, the first antenna may be shut-off. In other implementations, the second antenna may be used to help establish a link with second receiver 106 and then transmitter 102 switches the first antenna from first receiver 104 to second receiver 106. Various other handoff and antenna configurations may be employed with the features of the invention.

According to one implementation, transmitter 102 may be mounted on an aircraft and used to transmit one or more types of signals to receiving base stations on the ground. Such aircraft-mounted transmitter may allow the aircraft, pilot and/or passengers to send and receive voice and/or data from locations on the ground or other aircraft.

In another implementation, both the transmitting device 102 and receiving base stations may be at fixed locations or static. Alternatively, the transmitting device 102 and one or more of the receiving base stations may be moving or mobile. Moreover, in yet another implementation, the transmitting device 102 may be static and one or more of the receiving base stations may be moving or mobile. Thus, features disclosed herein can be applied to any of these scenarios.

Figure 8:
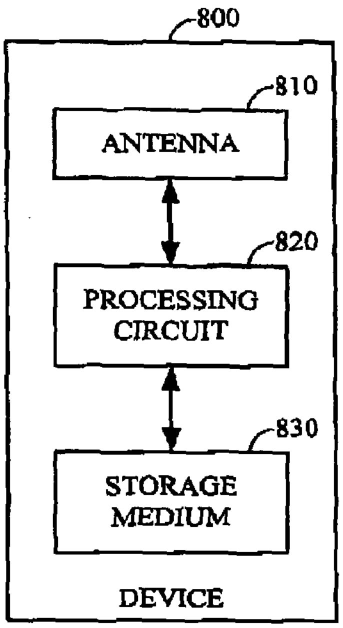
FIG. 8 shows an example device that may be used in mitigating antenna array pattern distortions.

FIG. 8 shows an example device 800 that may be used in mitigating antenna array pattern distortions in signals transmitted to different receivers. Device 800 may comprise a directional antenna 810 and a processing circuit 820 configured to process signals transmitted through the directional antenna as described above. The processing circuit 820 may comprise of an input interface and circuits used in processing signals as described above. Device 800 may also comprise a storage medium 830 that may comprise instructions executable by processing circuit 820 for mitigating antenna array pattern distortions in signals transmitted to different receivers.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method for receiving signals, comprising:
detecting a first signal that is a spectrally inverted version of a second signal, wherein the first signal and the second signal are transmitted concurrently or substantially concurrently by a wireless transmitter;
receiving the first signal from the wireless transmitter;
demodulating the first signal using a spectrum inversion code; and
switching from receiving the first signal to receiving the second signal in response to meeting a condition.

2. The method of claim 1, further comprising:
notifying the wireless transmitter that at least one of the first signal or the second signal has been received.

3. The method of claim 1, wherein the switching comprises switching from the receiving the first signal to the receiving the second signal as a function of a time elapsing after the receiving the first signal.

4. The method of claim 1, wherein the switching comprises:
receiving a control signal from the wireless transmitter indicating that the switching is to occur in a defined period of time; and
switching from receiving the first signal to receiving the second signal in response to elapsing of the time.

5. The method of claim 4, wherein the receiving the control signal comprises receiving the control signal as an out of band signal.

6. A non-transitory machine-readable medium comprising instructions executable by a processor for receiving signals from a transmitter, which, in response to execution by the processor, cause the processor to perform operations comprising:
searching for a first signal that is a spectrum-inverted version of a second signal being transmitted concurrently or substantially concurrently with the first signal;
receiving the first signal from the transmitter;
demodulating the first signal using a spectrum inversion code; and
switching from receiving the first signal to receiving the second signal in response to a meeting a condition.

7. The non-transitory machine-readable medium of claim 6, wherein the operations further comprise:
receiving a control signal from the transmitter indicating that the switching is to occur in a defined period of time; and
switching from receiving the first signal to receiving the second signal at or substantially at the defined period of time.

8. The non-transitory machine-readable medium of claim 6, wherein the operations further comprise switching from receiving the first signal to receiving the second signal a defined period of time after receiving the first signal.

9. An apparatus for receiving signals, comprising:
a receiver configured to receive a first wireless signal from a transmitter, wherein the first wireless signal is a spectrally inverted version of a second wireless signal transmitted concurrently or substantially concurrently with the first wireless signal, and wherein the receiver is further configured to switch from reception of the first wireless signal to reception of the second wireless signal in response to a condition defined by a rule; and
a demodulation component configured to demodulate the first wireless signal using a spectrum inversion code.

10. The apparatus of claim 9, further comprising a notification component configured to notify the transmitter that at least one of the first wireless signal or the second wireless signal has been received.

11. The apparatus of claim 9, wherein the receiver is further configured to switch from the reception of the first wireless signal to the reception of the second wireless signal in response to reception of a control signal transmitted by the transmitter.

12. The apparatus of claim 9, wherein the receiver is further configured to switch from the reception of the first wireless signal to the reception of the second wireless signal in response to a period of time elapsing.

13. The apparatus of claim 9, wherein the receiver is further configured to switch from the reception of the first wireless signal to the reception of the second wireless signal in response to a defined period of time elapsing after receiving the first signal.

14. An apparatus for receiving signals from a transmitter, comprising:
means for searching for a first signal transmitted by a transmitter, wherein the first signal is a spectrum-inverted version of a second signal transmitted concurrently or substantially concurrently by the transmitter;
means for receiving the first signal;
means for demodulating the first signal using a spectrum inversion code;
means for switching from receiving the first signal to receiving the second signal in accordance with a rule.

15. The apparatus of claim 14, further comprising means for notifying the transmitter that at least one of the first signal or the second signal has been received.

* * * * *